United States Patent
Westphal et al.

(10) Patent No.: US 6,946,664 B2
(45) Date of Patent: Sep. 20, 2005

(54) SPECIMEN SLIDES AND METHODS AND USES THEREOF

(75) Inventors: Peter Westphal, Jena (DE); Tobias Neumann, Jena (DE); Martin Kuehner, Bad Klosterlausnitz (DE); Dieter Graefe, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 211 days.

(21) Appl. No.: 10/349,179

(22) Filed: Jan. 22, 2003

(65) Prior Publication Data

US 2003/0156990 A1 Aug. 21, 2003

(30) Foreign Application Priority Data

Jan. 23, 2002  (DE) ........................................ 102 02 466

(51) Int. Cl.$^7$ ............................................. G01N 21/64
(52) U.S. Cl. ................................................. 250/458.1
(58) Field of Search ......................... 250/458.1; 422/99

(56) References Cited

U.S. PATENT DOCUMENTS

| | | | |
|---|---|---|---|
| 4,207,554 A | * | 6/1980 | Resnick et al. ............. 382/133 |
| 4,607,921 A | | 8/1986 | Miller ........................ 350/536 |
| 5,313,264 A | | 5/1994 | Ivarsson et al. .............. 356/76 |
| 5,639,671 A | | 6/1997 | Bogart et al. |

FOREIGN PATENT DOCUMENTS

| | | |
|---|---|---|
| DE | 3333674 | 3/1984 |
| JP | 10123429 | 5/1998 |
| WO | WO 99/00689 | 1/1999 |
| WO | WO01/27599 | 4/2001 |

\* cited by examiner

*Primary Examiner*—David Porta
*Assistant Examiner*—Marcus Taningco
(74) *Attorney, Agent, or Firm*—Patterson, Thuente, Skaar & Christensen, P.A.

(57) ABSTRACT

Emboidments are presented to improve spatial resolution or sensitivity in measuring fluorescent layers, including an embodiment wherein a specimen slide is provided which is not fluorescent by itself, is plate-shaped and has at least one plate side provided with fluorescent light absorbing properties, or with an antireflection-coating for fluorescent radiation.

12 Claims, 4 Drawing Sheets

SPECIMEN SLIDES AND METHODS AND USES THEREOF

CROSS REFERENCE TO RELATED APPLICATIONS

This application claims priority to German Patent Application File No. 102 02 466.9, filed Jan. 23, 2002, which is hereby incorporated by reference herein.

FIELD OF THE INVENTION

The field of the invention relates to a specimen slide; more particularly, to a specimen side that is not fluorescent by itself and is suitable, for example, for fluorescence microscopy or for biochip applications. The field of the invention further relates to the use of a specimen slide in fluorescence microscopy as well as to a fluorescence microscope, which comprises a specimen slide support having a top surface on which a specimen slide may be placed.

BACKGROUND

It is known, in fluorescence microscopy and in biochip applications, for spatially resolved, photometric measurement of fluorescent substances, to apply these substances on a transparent carrier plate, the so-called specimen slide. The fluorescent substances are then excited using suitable radiation, and fluorescent radiation they emit is detected in a spatially resolved manner. In the interest of good precision of measurement, falsifications of the fluorescent radiation intensity should, in this case, be kept to a minimum.

Therefore, confocal microscopes are presently used for high-precision measurements, said confocal microscopes having such a low depth of focus that they receive fluorescent radiation only from the fluorescent substance layer to be analyzed. This effectively blocks out radiation within the fluorescent wave-length range originating from other regions. Thus, it is ensured that fluorescent radiation is picked up only from an area to be analyzed. However, this advantage is obtained at the cost of a corresponding complexity of microscope equipment, since the focusing ability required for confocal imaging in the microscope is usually achievable only by means of a laser. Moreover, this strongly restricts the choice of the light source.

Another approach provides for taking a plurality of spatially resolved pictures in different ranges of depth of the objective and for subsequent mathematical processing thereof. However, this approach requires calculations of considerable complexity, so that it takes longer to take a picture. Further, the sensitivity of detection may be reduced.

Moreover, this known method is only conditionally suitable for handling processes in a time-resolved manner, because taking a plurality of pictures and effecting the required subsequent mathematical processing takes a certain time.

If the complexity of a confocal measurement microscope or the above-described mathematical correction is dispensed with, a falsification of the measurement result has to be accepted or the sensitivity of measurement needs to be lowered.

On Nov. 20, 2001, the Electron Microscopy Sciences Catalog depicted a specimen slide under order no. 71876-0, said specimen slide having its bottom surface roughened by sand blasting. According to the explanation in the catalog, such roughening serves to ensure better writeability of the bottom surface of the specimen slide.

BRIEF DESCRIPTION OF THE FIGURES

The invention will be explained below in more detail, by way of example and with reference to the Figures, wherein.

DETAILED DESCRIPTION OF PREFERRED EMBODIMENTS OF THE INVENTION

Figure 1:
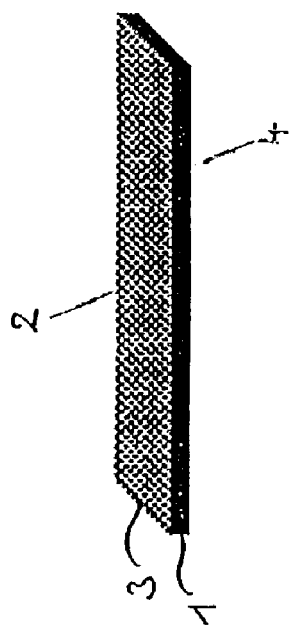
FIG. 1 shows a perspective view of a specimen slide.

An embodiment of the invention provides means for fluorescence microscopy enabling improved precision of measurement without increased complexity of equipment or process technology.

Certain embodiments include a specimen slide which exhibits no fluorescence by itself, is plate-shaped and has at least one plate side provided with fluorescent light absorbing properties or with an antireflection coating for fluorescent radiation.

Certain embodiments include a fluorescence microscope comprising a specimen slide support, which has a top surface on which a specimen slide can be placed and which does not reflect fluorescent radiation coupled-in at the top surface back to said top surface, as well as by the use of a specimen slide which is plate-shaped and does not reflect fluorescent radiation incident on one plate side back to said plate side, for fluorescence microscopy in a non-confocal fluorescence microscope.

Some aspects of the invention are based on the recognition that measurement quality is substantially reduced by optical cross-talk between adjacent areas of a layer to be examined. Among others, such cross-talk leads to limited spatial resolution in the photometric measurement of fluorescent substances present on the top surface of a specimen slide facing the objective. In this case, it turns out that said cross-talk is caused by reflections of fluorescent light at glass/air interfaces, with a reflection ultimately appearing always below the fluorescent substance.

Two processes were found to be important: on the one hand, fluorescent light, which is emitted by an object surface of the specimen slide provided with fluorescent molecules and, thus, exits into the specimen slide, is reflected, at least partially, at a specimen slide/air interface on the opposite side and returned to the surface on the side of the objective, on which surface the substance layer is provided. From there, said fluorescent light is sensed in the microscope and leads to falsification of the measured light intensity. On the other hand, fluorescent light emitted by the specimen slide surface provided with fluorescent molecules may be reflected by a cover glass arranged between the surface provided with said molecules and the microscope objective and may then be returned to the microscope via further reflection at the specimen slide. This also leads to falsification in the form of optical cross-talk.

Certain embodiments eliminate both processes either by absorption of fluorescent radiation taking place beneath the fluorescent layer or by ensuring that no back-reflection to the top surface, and thus to the microscope objective, is possible. This prevents cross-talk between adjacent areas.

Said absorption or said prevention of back-reflection may be effected either in the specimen slide itself, by providing the specimen slide with suitable fluorescent light absorbing properties beneath the surface intended for reception of the fluorescent substance layer. Alternatively, an antireflection layer on the bottom surface of the specimen slide, located opposite the top surface onto which the fluorescent substance layer is to be applied, can ensure that fluorescent radiation entered into the specimen slide will exit at the bottom thereof without being reflected there. In such a specimen slide care must be taken, by suitable measures, that the fluorescent radiation is not reflected back again to the specimen slide in an undesirable manner by the support on which the specimen slide rests.

Therefore, the fluorescence microscope, according to certain embodiments, does not reflect fluorescent radiation incident on the specimen slide support back to the specimen slide. In the simplest of cases, an absorbing or non-reflecting top surface of the specimen slide support is sufficient for this purpose.

The specimen slide support in a fluorescence microscope is usually a glass body. In order to avoid, as desired, any reflection of fluorescent radiation at the top surface of said support, said top surface may be provided with an antireflection coating. Alternatively, it is possible to place the specimen slide on the support with an intermediate liquid layer between the slide and the support having a refractive index similar to that of the specimen slide or of the glass block. This can be done by employing immersion oils which are known, per se, for use between a cover glass and a microscope objective in microscopy. If one wishes to avoid a liquid whose handling, as experience has shown, is difficult to automate, use may be made of a layer of a transparent solid, but flexible material exhibiting the required optical properties, i.e., avoiding interface reflection. One example of such material is described, for example, in U.S. Pat. No. 5,313,264.

If care is taken that the fluorescent radiation is not reflected at the top surface of the specimen slide support, it may be achieved, by various suitable means, that radiation coupled into the specimen slide support is not returned to the specimen slide. In the simplest of cases, the aforementioned property of absorbing fluorescent light is sufficient.

In a particularly convenient embodiment of a fluorescence microscope, the bottom surface of the specimen slide support located opposite the top surface onto which the specimen slide is placed has reflecting properties and is designed such that the reflected radiation is directed away from the specimen slide. For this alternative, a fluorescence microscope is preferred whose specimen slide support comprises a bottom surface located opposite the top surface, which bottom surface is not parallel to the top surface and has, in particular, an angle of greater than 45° to the top surface.

Such specimen slide support deflects coupled-in fluorescent radiation such that it can no longer return to the specimen slide, i.e., to the microscope objective.

While the above-described microscope has the advantage that it enables an improvement in spatial resolution even with conventional specimen slides, the specimen slides according to the invention have the advantage that they produce a considerable improvement even with conventional standard microscopes, since the back-reflection of fluorescent radiation is prevented already in the specimen slide itself.

The simplest way of preventing reflection is by a suitable absorbing layer. In order to achieve the desired effect according to the invention, such layer merely needs to be arranged beneath the substance layer which exhibits fluorescent properties, the term "beneath" referring to the viewing direction through the microscope objective. In this embodiment, the plate-shaped specimen slide is preferably provided with a light-absorbing coating on one plate side.

In fluorescence microscopy, it is helpful when there is no undesirable fluorescence of the specimen slide. Since, depending on the application in fluorescence microscopy, fluorescent radiation is excited or detected within a broad spectral range—usually, a wavelength range from between 300 and 700 nm is used—the material of the specimen slide should exhibit little or no fluorescence within this wavelength region. In this case, according to the invention, the expression "no fluorescence" means that fluorescence is present only to such a small extent that it does not affect usual fluorescence analysis. Otherwise, there would not be the desired suitability for fluorescence microscopy, since a specimen slide exhibiting fluorescence would blanket any measurement signal. Therefore, glass has proven to be a suitable material, because it shows no fluorescence by itself.

Accordingly, in a particularly easily achievable embodiment, a plate-shaped glass body is provided with a light-absorbing coating, e.g., blackened, on one plate side. In this case, said coating may be obtained by any suitable process, for example by varnishing, evaporation, sputtering, etching, plasma treatment, UV radiation, polymer coating (e.g., with cellulose products) or by eloxation. The coated side may be used in the specimen slide both as the later bottom surface and as the top surface, onto which a fluorescent substance layer is then applied. In any case, said coated side is arranged beneath the substance layer. For reasons of purity, however, the substance layer will be applied, in most cases, to the uncoated plate side of the glass body so as to avoid undesirable interactions between said substance and said coating.

A structure wherein the substance layer is arranged on a transparent top surface of a specimen slide has the advantage that an autofocusing system still sees a suitable air/substrate transition for focusing on the interface.

Alternatively, the specimen slide may also comprise a solid body which absorbs fluorescent light, wherein the entire specimen slide may be provided as a solid body. For the solid body, for example, glass comprising inclusions of absorbing metal oxides may be used.

Such substances are also suitable for application of the light-absorbing layer. Therefore the specimen slide preferably comprises a fluorescent light absorbing substance, in particular a metal oxide.

In case a microscope is used whose specimen slide support does not reflect fluorescent radiation, care has to be taken that no fluorescent reflection occurs at the bottom surface of the specimen slide. This may be effected, for example, by a suitable antireflection coating, which is preferably designed for broad-band use, in order to be effective for fluorescent radiation of the most diverse fluorophores.

The better the absorption properties of the specimen slide are, the stronger will be the suppression of optical cross-talk. It has turned out that a reduction of back-reflection by 20% already yields a considerable improvement in the quality of measurement. Consequently, this enhances spatial resolution. Improved absorption is achieved if the bottom surface of the plate, in addition to the light-absorbing coating, is designed to diffusely reflect fluorescent radiation. This may be effected, for example, by suitable roughening. Otherwise, a disturbing reflection component may possibly not be ruled out in spite of an absorbing coating.

In order to achieve good adhesion or good biocompatibility for substances to be analyzed, regardless of their material, it is advantageous to coat the top surface of the specimen slide with an adhesion-improving or biocompatibility-enhancing layer, e.g., $SiO_2$. This will then provide maximum liberty in the selection of the specimen slide material.

According to certain embodiments of the invention, a specimen slide which does not back-reflect fluorescent radiation coupled-in on one plate side allows to dispense with confocal fluorescence microscopes, without, at the same time, having to waive spatial resolution. Therefore, according to the invention, there is provided the use of a specimen slide, which is plate-shaped and does not reflect fluorescent radiation incident on a plate side back to said plate side, for fluorescence microscopy in a non-confocal fluorescence microscope. The use of such specimen slide surprisingly allows one to dispense with confocal fluorescence microscopes, previously believed to be unavoidable, which microscopes are not only purchased at great cost, but are also more expensive to keep up, maintain and operate. Thus, using simple fluorescence microscopes, a previously unattainable spatial resolution or sensitivity of measurement may be achieved, since the use of the aforementioned specimen slides attenuates optical cross-talk and consequently enhances spatial resolution. As specimen slide, in this case, one of the aforementioned specimen slides is suitable; essentially, however, it is important only that said specimen slide, if possible, suppresses that fluorescent radiation which does not pass to the objective directly from the substance layer, but via reflections.

FIG. 1 depicts a perspective view of a specimen slide 1 having a top surface 2 onto which a fluorescent layer 3 is applied. For analysis in a microscope, the bottom surface 4 of a specimen slide 1 is placed on a specimen slide support and its top surface 2 is irradiated with excitation radiation. The fluorescent radiation emitted due to said excitation is then picked up, in a spatially resolved manner, by a microscope objective arranged above the top surface 2.

The specimen slide 1 is a solid body absorbing fluorescent light, which solid body consists of a basic substance having no noticeable autofluorescence in the range of from 300 to 700 nm. Said basic substance is mixed with a fluorescent light absorbing substance, e.g., on the basis of metal oxides, such that it is colored upon being molded into the plate-shaped specimen slide 1. In this case, said coloring is such that absorption is achieved parallel to the top surface 2 over the entire cross-section of the specimen slide 1. The coloring is preferably black, but any other coloring which absorbs fluorescent radiation is suitable.

These light-absorbing properties have the effect that no noticeable fluorescent light component can penetrate the plate and can thus not be reflected back again to the top surface 2. Also, radiation reflected by a cover glass (not shown) arranged above the fluorescent layer 3 is absorbed by the colored specimen slide 1 and can thus not pass to the microscope objective.

Figure 2:
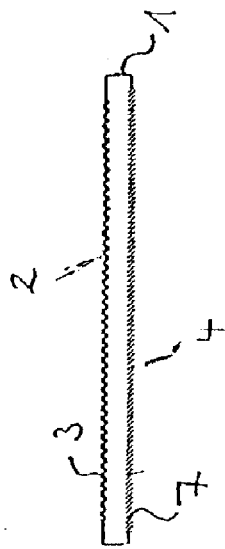
FIGS. 2 to 5 show sectional views of specimen slides.

FIG. 2 shows a further embodiment of a specimen slide 1, wherein elements corresponding to those of the specimen slide of FIG. 1 are provided with the same reference numerals. On the top surface 2 of the specimen slide 1 of FIG. 2, there is also a fluorescent layer 3. However, beneath the fluorescent layer 3, there is a coating 6 between the body 5 of the specimen slide 1, which coating absorbs fluorescent radiation. This coating is produced, for example, by varnishing, evaporation, sputtering, etching, plasma treatment or eloxation and has the effect that no noticeable light component can penetrate the plate-shaped specimen slide 1 and, accordingly, can not be reflected either at the bottom surface 4. Light reflected by a cover glass is also absorbed by the coating 6. As to the optical properties of the coating 6, what has been said about the coloring of the specimen slide of FIG. 1 applies accordingly. Also, in addition, the specimen slide may be non-transparent.

Figure 3:
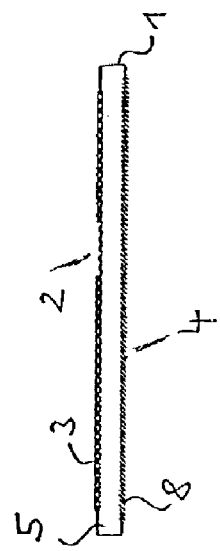

FIG. 3 shows a modification of the design of FIG. 2, wherein the fluorescent light absorbing coating 6 is present on the bottom surface 4 of the body 5 of the transparent specimen slide 1. Otherwise, what has been said with reference to FIG. 2 applies accordingly.

Figure 4:
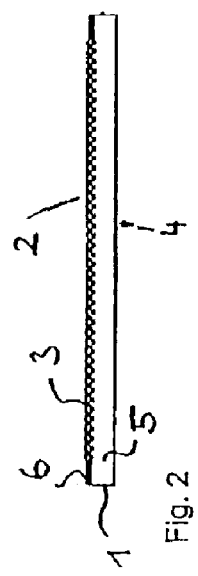

FIG. 4 shows a specimen slide 1 which essentially corresponds to the specimen slide of FIG. 3. However, in this case, instead of the fluorescent light absorbing coating 6, an antireflection coating 7 is now provided on the bottom surface 4 of the specimen slide 1. Said antireflection coating 7 is a broad-band coating for the entire range in which the fluorescent activity of fluorophores used in fluorescence analysis occurs. Optionally, it may also be selective for one or more wavelengths of typical fluorophores (e.g., Cy3, C5, FGTC). The antireflection coating 7 causes fluorescent light coupled into the plate-shaped specimen slide 1 by the fluorescent layer 3 at the top surface 2 to exit said specimen slide 1 at the bottom surface 4 and not to be reflected back to the top surface 2.

Figure 5:
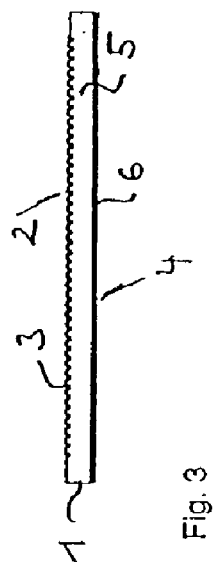

FIG. 5 shows a further modification of the design of FIG. 3. In this case, the coating on the bottom surface 4 is replaced by a composite structure 8, which consists of the combination of a roughened bottom surface 4 and a fluorescent light absorbing layer subsequently applied thereon. The roughening has the effect that fluorescent light which is incident from the fluorescent layer 3 on the top surface 2 is absorbed even better by the bottom surface 4; in any case, said roughening of the composite structure 8 prevents specular back-scattering. At most, there will be diffuse back-scattering, resulting in a strongly reduced radiation intensity on the top surface 2.

Figure 6:
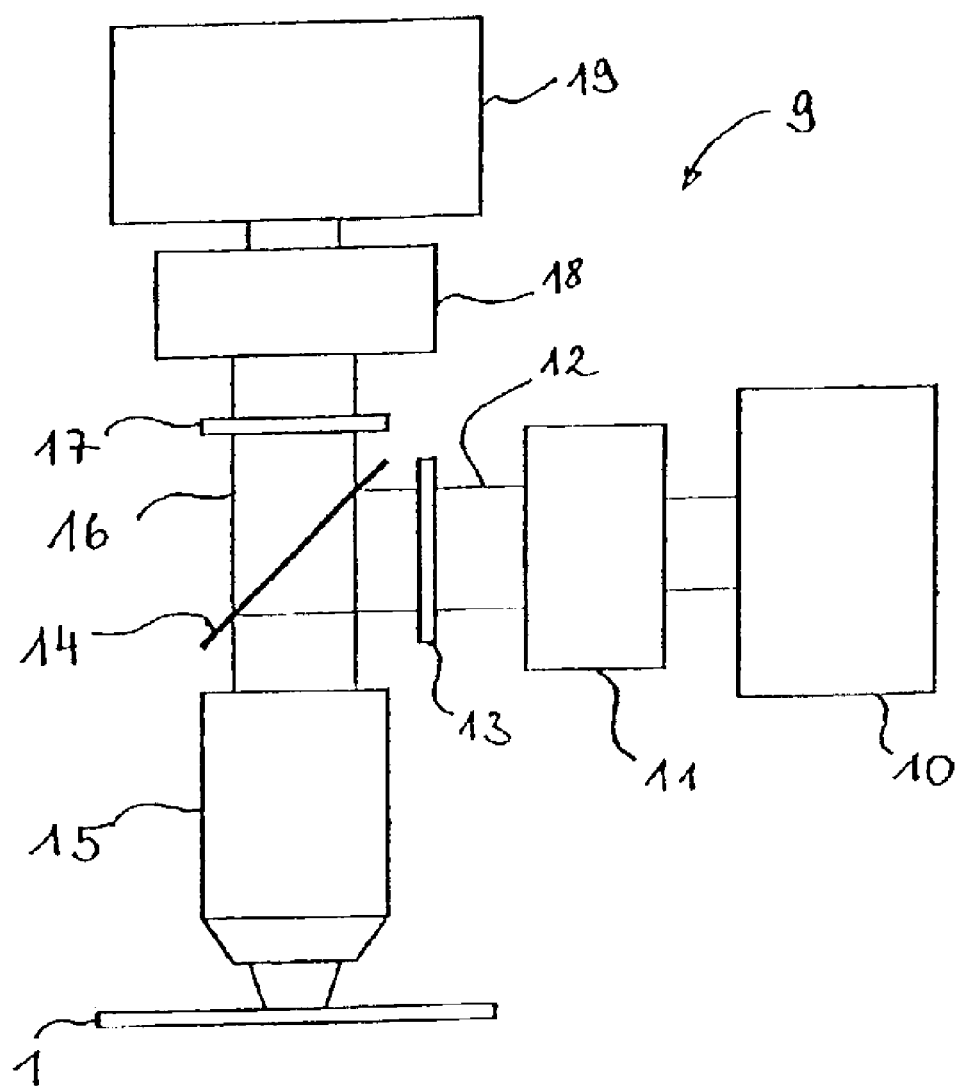
FIG. 6 shows a schematic representation of a non-confocal fluorescence microscope.

All of the aforementioned specimen slides allow confocal imaging to be dispensed with in a fluorescence microscope without having to accept a loss in spatial resolution or in sensitivity of measurement. Therefore, they will preferably be used in a non-confocal fluorescence microscope 9, as schematically represented in FIG. 6. Such fluorescence microscope 9 usually comprises a light source 10, which illuminates an excitation filter 13 via an optical system 11 in an excitation beam path 12. In this case, the light source 10 is preferably a broad-band light source, e.g., a white light source, such as a halogen lamp or an arc lamp. Of the radiation incident in the excitation beam path, the excitation filter 13 transmits only a desired spectral component intended for fluorescence excitation. The excitation filter 13 may be omitted, if a narrow-band light source, e.g., a laser or an LED, is used as light source 10.

The excitation radiation is incident on a beam splitter 14 which has a reflecting effect in the excitation wavelength range. Said beam splitter 14 directs the generated excitation radiation to an objective 15, which illuminates a specimen slide 1 therewith, on which specimen slide 1 there is located the aforementioned fluorescent layer (not shown in FIG. 1). Alternatively, the excitation light may also not be guided through the objective, but may be incident obliquely sideways, past the objective 15 and onto the specimen slide 1.

The objective 15 picks up fluorescent radiation emitted at the specimen slide 1 and directs it into a viewing beam path 16. In this case, the beam splitter 14 is designed such that it transmits radiation at the wavelength of said fluorescence. Said fluorescent radiation is imaged onto a camera 19, e.g., a CCD receiver, by an emission filter 17, which serves to block out any excitation radiation passing into the viewing beam path 16, and by an optical system 18.

In spite of the relatively large-scale excitation and imaging of the fluorophores, no optical cross-talk occurs during use of a specimen slide which ensures that fluorescent radiation incident at its top surface is not reflected back to the microscope. Otherwise required confocal imaging can, therefore, be dispensed with in the fluorescence microscope 9 without having to accept a limitation in spatial resolution or sensitivity of measurement. Further, by the large-scale scanning of the specimen slide 1, the measuring speed is considerably increased as compared with confocally operating microscopes.

The fluorescence microscope may be a specialized optical read-out device for biochips.

Figure 7:
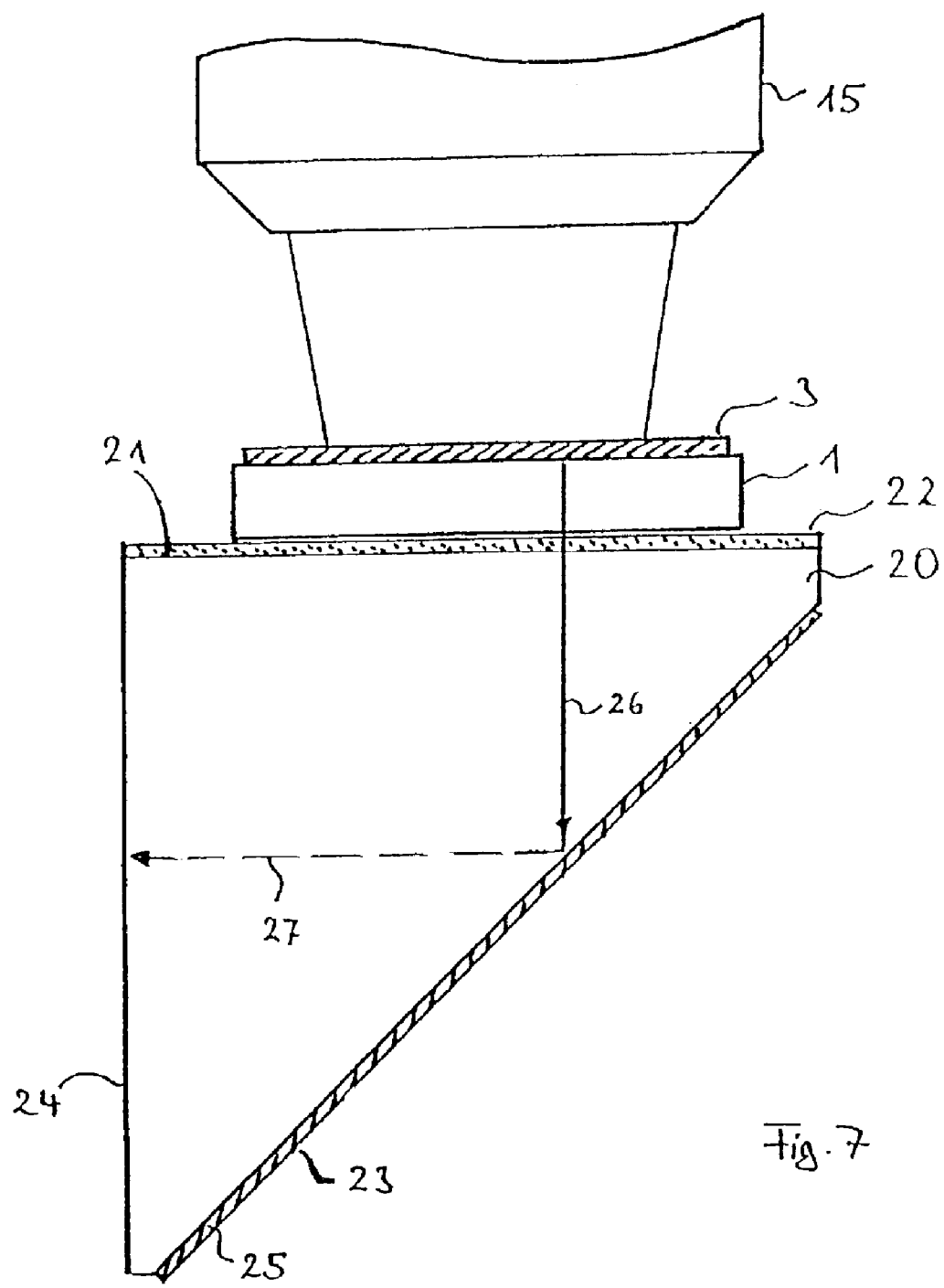
FIG. 7 shows a schematic sectional view of the specimen slide support of a fluorescence microscope and
FIGS. 8 and 9 show intensity profiles illustrating the influence of the specimen slide on spatial resolution.

FIG. 7 shows a sectional view of a measurement microscope whose specimen slide support ensures that fluorescent radiation coupled into a specimen slide is not reflected back to the microscope objective 15. For this purpose, the microscope comprises a carrier block 20 made of a glass body. The carrier block 20 has a top surface 21 on which there is present an index layer 22, which ensures that fluorescent radiation coupled into the specimen slide 1 from the fluorescent layer 3 is not reflected at the top surface 21. Said index layer 22 may be, for example, an oil immersion or an elastic transparent solid having comparable optical properties. In a first variant, the bottom surface 23 of the carrier block 20 is designed to be specularly reflecting. Radiation 26 incident on the carrier block 20 from the specimen slide 1 is thus deflected and passes, as radiation 27, to an exiting surface 24 from which it cannot return to the specimen slide 1. Instead of the mirror layer 25, an absorbing layer may also be provided. In general, what has been said about the specimen slide 1 with respect to FIGS. 1 to 5 applies analogously to the carrier block 20; all means mentioned there of preventing that fluorescent radiation may exit again at the top surface 21, can also be used for the carrier block 20. In particular, the bottom surface 23 need not extend obliquely to the top surface 21, but for the design wherein the radiation 26 is deflected to the exiting surface 24 as radiation 27 an oblique mirror layer 25 is necessary.

Figure 8:
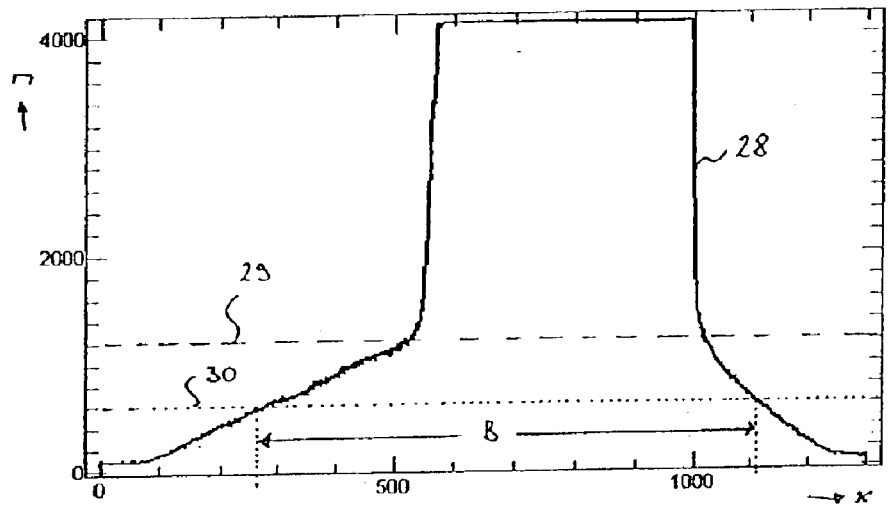
Figure 9:
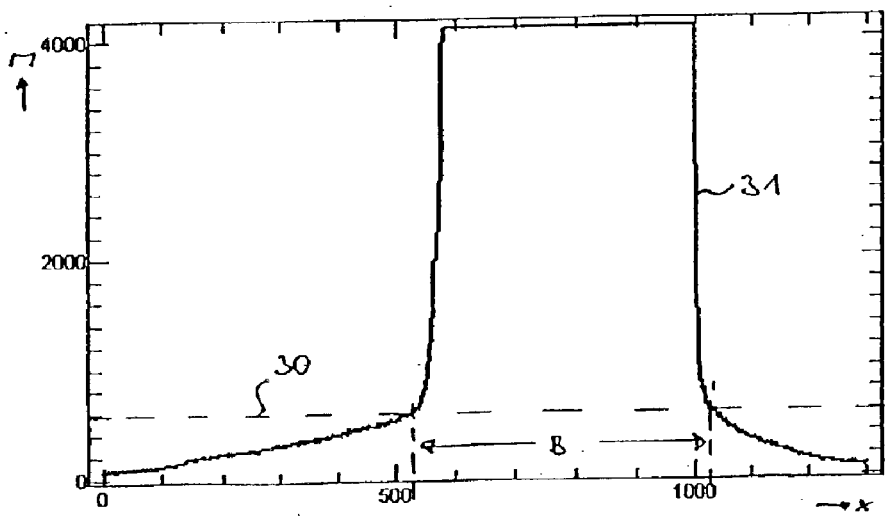

Intensity profiles in FIGS. 8 and 9 show the effects which the concept of preventing back-reflection of fluorescent radiation incident on the specimen slide has on spatial resolution or on the sensitivity of detection. In this case, intensity I is plotted in one dimension above the x coordinate.

FIG. 8 shows the intensity profile in case of back-reflection. This is shown by a graph 28. As can be seen, the actual width of the fluorescent element is approximately 500 units in the x-direction. However, this width is obtained only on the basis of an intensity threshold 29 of approximately 1200 intensity units or more. At the same time, however, a high intensity threshold 29 means a low sensitivity of measurement. From this point of view it is, of course, desirable to lower the intensity threshold as far as possible. However, lowering it below the intensity threshold 29 causes spatial resolution to decrease, since the width of the fluorescent area is then perceived as larger than it actually is. If, for example, the intensity threshold indicated at 30 is selected, a width B of almost 900 units of length in the x-direction is obtained. Thus, spatial resolution is reduced to almost half its previous value.

If, as described before, back-reflection of fluorescent radiation incident on the top surface of a specimen slide is prevented, this will result in the intensity profile shown by the graph 31 of FIG. 9. As can be seen, the leading edge between 0 and 500 units of length of graph 31 is considerably much flatter than that of graph 28. As a consequence, the correct width B is determined also at a low intensity threshold 30 of about 300 intensity units. Thus, while the spatial resolution remains the same, the detection limit is reduced nearly by half by lowering the intensity threshold from 500 to 300 intensity units. In doing so, the graph 31 of FIG. 9 was obtained using a prototype which was not yet optimized in terms of its absorbing properties.

The examples set forth herein are not intended to limit the scope or spirit of the invention. All publications, patent applications, and patents referenced in this application are hereby incorporated by reference herein.

What is claimed is:

1. A specimen slide comprising
   two parallel surfaces connected by a thickness to form a plate, wherein the plate is not autofluorescent and
   at least one of the surfaces is treated to absorb fluorescent radiation, or
   at least one of the surfaces is at least partially coated with an anti-reflection coating which prevents specular reflection of fluorescent radiation.

2. The specimen slide of claim 1, wherein the plate is made of glass.

3. The specimen slide of claim 1 wherein at least one of the surfaces is blackened.

4. The specimen slide as claimed in claim 1, wherein the plate surface comprises a fluorescent light absorbing substance.

5. The specimen slide as claimed in claim 1, wherein the at least one of the surfaces diffusely reflects fluorescent radiation.

6. The specimen slide as claimed in claim 1, wherein at least one of the surfaces is provided with an adhesion-improving layer or a biocompatibility-increasing layer.

7. A method of using a specimen slide comprising:
   providing a specimen slide comprising a first surface parallel to a second surface, with the surfaces being connected by a thickness to form a plate, wherein the second surface is provided with a coating absorbing fluorescence radiation or preventing specular reflection of fluorescence radiation so that fluorescent radiation incident on the second surface is not reflected by the plate back to the first surface,
   and using the specimen slide for fluorescence microscopy in a non-confocal fluorescence microscope.

8. The method of claim 7, wherein the plate is made of glass.

9. The method of claim 8 wherein at least one of the surfaces is blackened.

10. The method of claim 7, wherein the plate comprises a fluorescent light absorbing substance.

11. The method of claim 7, wherein the plate comprises a metal oxide.

12. The method of claim 7, wherein at least one of the surfaces diffusely reflects fluorescent radiation.

* * * * *